(12) United States Patent
Omori

(10) Patent No.: US 11,927,214 B2
(45) Date of Patent: Mar. 12, 2024

(54) THRUST FOIL BEARING

(71) Applicant: IHI CORPORATION, Tokyo (JP)

(72) Inventor: Naomichi Omori, Tokyo (JP)

(73) Assignee: IHI CORPORATION, Tokyo (JP)

( * ) Notice: Subject to any disclaimer, the term of this patent is extended or adjusted under 35 U.S.C. 154(b) by 218 days.

(21) Appl. No.: 17/375,277

(22) Filed: Jul. 14, 2021

(65) Prior Publication Data

US 2021/0341012 A1 Nov. 4, 2021

Related U.S. Application Data

(63) Continuation of application No. PCT/JP2019/051147, filed on Dec. 26, 2019.

(30) Foreign Application Priority Data

Jan. 17, 2019 (JP) .................. 2019-005790

(51) Int. Cl.
 *F16C 17/04* (2006.01)
 *F16C 37/00* (2006.01)

(52) U.S. Cl.
 CPC .......... *F16C 17/042* (2013.01); *F16C 37/002* (2013.01)

(58) Field of Classification Search
 CPC .................................................. F16C 17/042
 See application file for complete search history.

(56) References Cited

U.S. PATENT DOCUMENTS 3,029,416 A * 4/1962 Quade ....................... G11B 5/48
4,621,930 A 11/1986 Gu et al.
2011/0150376 A1 6/2011 Lee
2012/0281936 A1 11/2012 Heshmat et al.
2012/0281937 A1 11/2012 Heshmat et al.
2015/0030270 A1 1/2015 Heshmat
2015/0219147 A1 8/2015 Furuno
2015/0369294 A1 12/2015 Rocchi et al.
2016/0195129 A1* 7/2016 Omori ................... F16C 17/042
 384/105
2017/0108031 A1 4/2017 Beers et al.
2021/0310515 A1* 10/2021 Omori ................... F16C 17/042

FOREIGN PATENT DOCUMENTS

| CN | 102937145 A | 2/2013 |
| CN | 105518323 A | 4/2016 |
| CN | 106837434 A | 6/2017 |
| EP | 2954221 A1 | 12/2015 |
| EP | 3036409 A1 | 6/2016 |
| GB | 1098334 A | 1/1968 |
| JP | 61-084417 A | 4/1986 |
| JP | 2005-282692 A | 10/2005 |

(Continued)

OTHER PUBLICATIONS

Yan, Jia-Jia et al., "Performance Aanalysis of Hydrodynamic Gas Foil Thrust Bearing based on Newton-Raphson Iterative Method", Turbine Technology, vol. 59 No. 2, Apr. 25, 2017, 6 pages.

*Primary Examiner* — James Pilkington

(74) *Attorney, Agent, or Firm* — Rothwell, Figg, Ernst & Manbeck, P.C.

(57) ABSTRACT

A thrust foil bearing includes a foil which faces a thrust collar mounted on a shaft in an axial direction, and a case which supports the foil and surrounds the thrust collar, wherein a cooling hole is formed in the case.

8 Claims, 11 Drawing Sheets

(56) References Cited

FOREIGN PATENT DOCUMENTS

| JP | 2012-500953 A | 1/2012 |
| JP | 2014-070730 A | 4/2014 |
| WO | 2014/061698 A1 | 4/2014 |
| WO | 2014/122388 A1 | 8/2014 |
| WO | 2015/026655 A1 | 2/2015 |

* cited by examiner

THRUST FOIL BEARING

This application is a Continuation Application based on International Application No. PCT/JP2019/051147, filed on Dec. 26, 2019, which claims priority on Japanese Patent Application No. 2019-005790, filed on Jan. 17, 2019, the contents of which are incorporated herein by reference.

TECHNICAL FIELD

The present disclosure relates to a thrust foil bearing.

BACKGROUND ART

Conventionally, as a bearing for a high-speed rotating body, a thrust foil bearing disposed to face a thrust collar provided on a rotating shaft is known (refer to, for example, Patent Literature 1 below). In the thrust foil bearing, a bearing surface is formed of a flexible foil (a thin metal plate) such that movement of the rotating shaft (axial displacement and inclination of the thrust collar) generated by vibration or impact can be absorbed, and the thrust foil bearing has a foil structure for flexibly supporting the bearing surface under the bearing surface.

The thrust foil bearing has a form in which a plurality of top foil pieces and back foil pieces are disposed in a circumferential direction. The top foil pieces are supported by the back foil pieces, and a lubricating fluid is introduced between the top foil pieces and the thrust collar by rotation of the thrust collar. This lubricating fluid forms a wedge-shaped fluid lubricating film between the top foil piece and the thrust collar, and a load capacity of the thrust foil bearing is thus exhibited.

CITATION LIST

Patent Literature

[Patent Literature 1]
  PCT International Publication No. WO2014-061698

SUMMARY OF THE INVENTION

Technical Problem

A shearing force due to fluid viscosity acts on the fluid lubricating film, and heat is generated. Therefore, the foil and a surface of the thrust collar which form the fluid lubricating film may be distorted by the heat, and the load capacity of the thrust foil bearing may not be sufficiently obtained.

The present disclosure has been made in view of the above circumstances, and an object thereof is to curb a decrease in a load capacity of a thrust foil bearing due to heat generation of a fluid lubricating film.

Solution to Problem

In order to solve the above circumstances, a thrust foil bearing of one aspect of the present disclosure includes a foil which faces a thrust collar mounted on a shaft in an axial direction, and a case which supports the foil and surrounds the thrust collar, wherein a cooling hole is formed in the case.

Further, in the one aspect of the present disclosure, an insertion hole through which the shaft is inserted may be formed in the case, and the cooling hole may be formed on an outer peripheral side of the case in a radial direction of the insertion hole.

Further, in the one aspect of the present disclosure, the case may include a base plate which supports the foil and has the insertion hole formed therein, and an annular bearing spacer which is mounted on an outer peripheral side of the base plate.

Further, in the one aspect of the present disclosure, at least one of a first cooling hole located at an axial position of the thrust collar and a second cooling hole located at an axial position of the foil may be formed as the cooling hole in the bearing spacer.

Further, in the one aspect of the present disclosure, at least one of a third cooling hole which overlaps the foil in the axial direction and a fourth cooling hole which does not overlap the foil in the axial direction may be formed as the cooling hole in the base plate.

Further, in the one aspect of the present disclosure, the cooling hole may be inclined in a rotation direction of the thrust collar as it goes from an outer side in a radial direction to an inner side in the radial direction.

Further, in the one aspect of the present disclosure, the cooling hole may be inclined in a direction opposite to a rotation direction of the thrust collar as it goes from an outer side in a radial direction to an inner side in the radial direction.

Further, in the one aspect of the present disclosure, the cooling hole may be inclined in a rotation direction of the thrust collar as it goes from the base plate of the case toward the thrust collar in the axial direction.

Further, in the one aspect of the present disclosure, the cooling hole may be inclined in a direction opposite to a rotation direction of the thrust collar as it goes from the base plate of the case toward the thrust collar in the axial direction.

Further, in the one aspect of the present disclosure, unevenness may be formed on an outer peripheral surface of the thrust collar.

According to the present disclosure, it is possible to curb a decrease in a load capacity of a thrust foil bearing due to heat generation of a fluid lubricating film.

DETAILED DESCRIPTION OF THE EMBODIMENTS

Hereinafter, a thrust foil bearing of the present disclosure will be described in detail with reference to the drawings.

Figure 1:
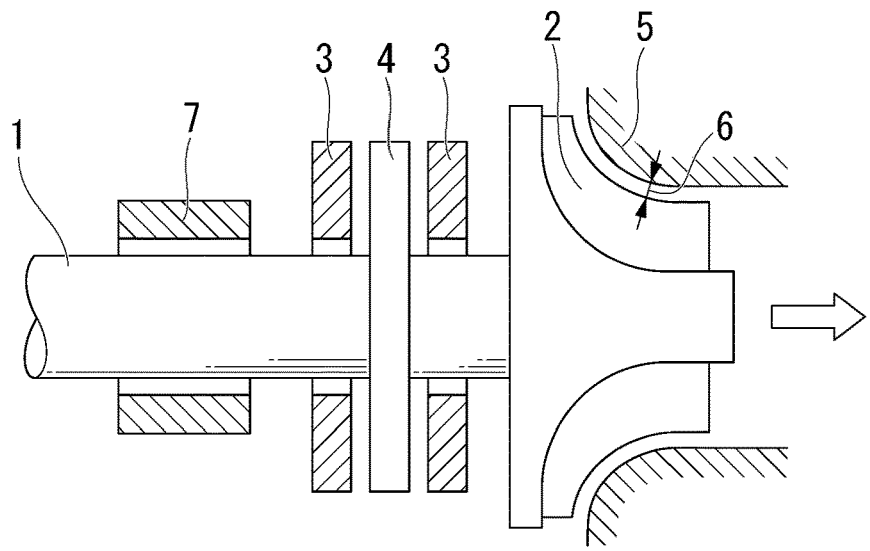
FIG. 1 is a side view showing an example of a turbomachine to which a thrust foil bearing of the present disclosure is applied.

FIG. 1 is a side view showing an example of a turbomachine to which a thrust foil bearing of the present disclosure is applied.

In FIG. 1, a reference numeral 1 is a rotating shaft (a shaft), a reference numeral 2 is an impeller provided at a tip end portion of the rotating shaft, and a reference numeral 3 is a thrust foil bearing according to the present disclosure.

A disk-shaped thrust collar 4 is mounted on the rotating shaft 1. The thrust collar 4 is sandwiched between a pair of thrust foil bearings 3. The impeller 2 is disposed in a housing 5 on the stationary side and has a tip clearance 6 between the impeller 2 and the housing 5. The rotating shaft 1 is supported by a radial foil bearing 7.

First Embodiment

Figure 2:
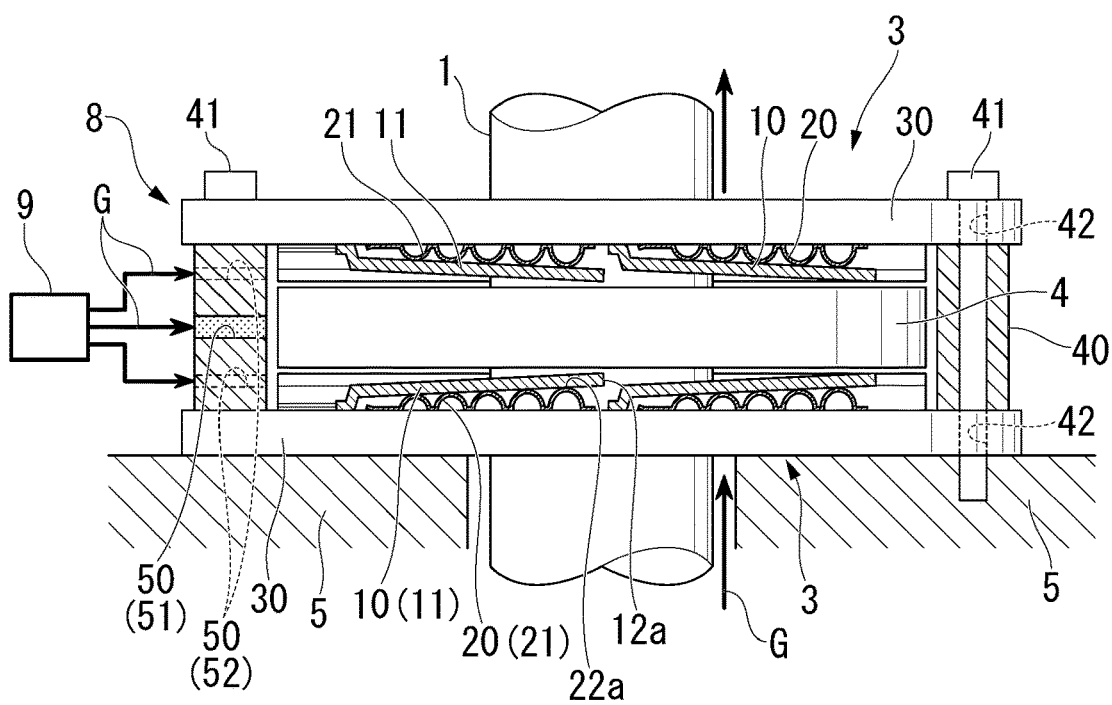
FIG. 2 is a side view showing a thrust foil bearing according to a first embodiment of the present disclosure.

FIG. 2 is a side view showing the thrust foil bearing 3 according to a first embodiment of the present disclosure.

As shown in FIG. 2, the pair of the thrust foil bearings 3 are provided on both sides of the thrust collar 4 in an axial direction and sandwiching the thrust collar 4 in the axial direction. Each thrust foil bearing 3 of the pair of thrust foil bearings 3 has the same configuration. The thrust foil bearing 3 includes a top foil 10, a back foil 20, and a base plate 30.

The thrust collar 4 is surrounded by a case 8. The case 8 includes the base plate 30 of each of the pair of thrust foil bearings 3 and a cylindrical bearing spacer 40 sandwiched between the base plates 30. A pair of base plates 30 are connected by fastening bolts 41 via the bearing spacer 40. A through hole 42 through which the fastening bolt 41 is inserted is formed in an outer peripheral portion of the base plate 30. One of the pair of base plates 30 of the present disclosure is in contact with the housing 5 by fastening with fastening bolts 41.

Figure 3:
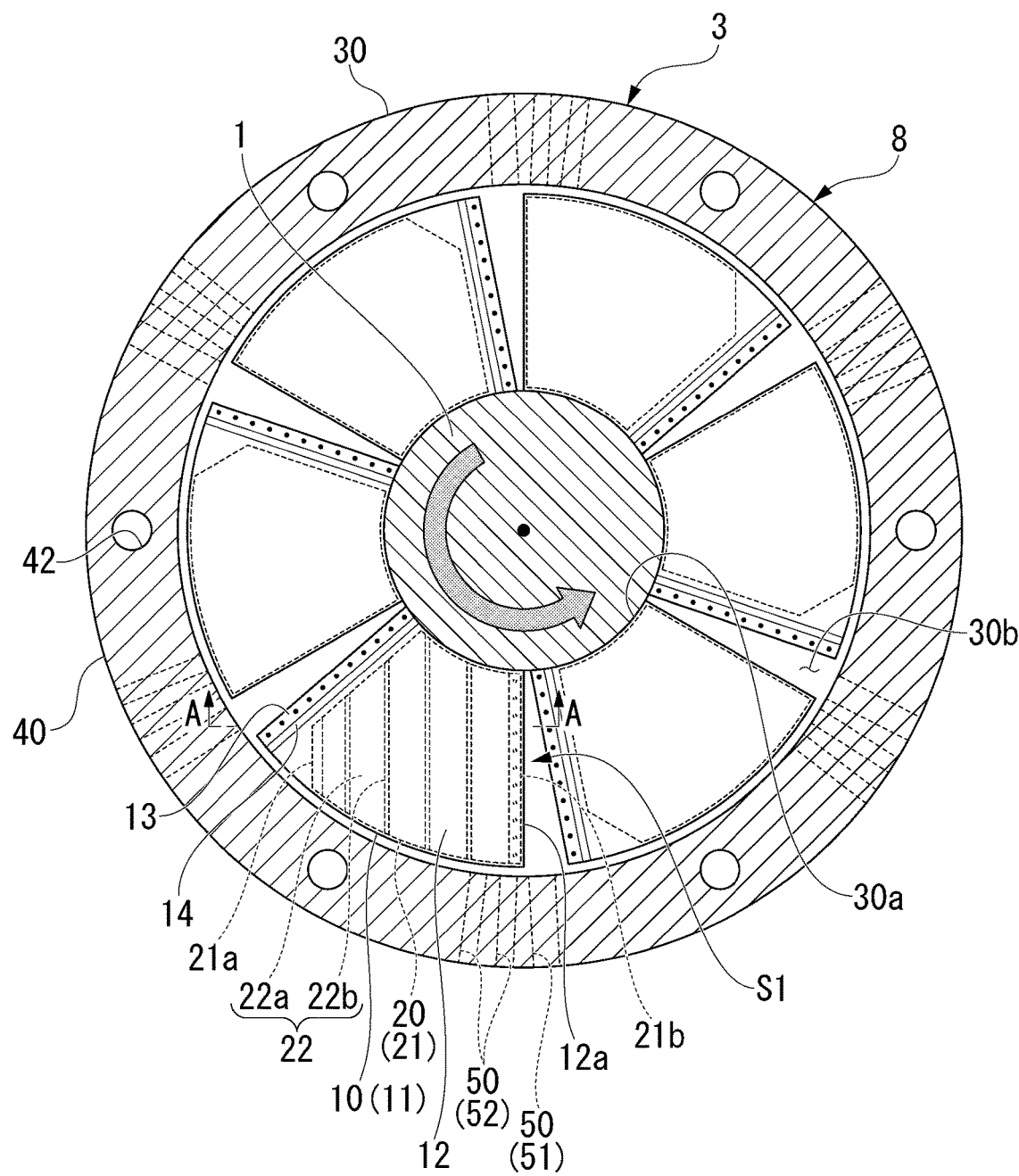
FIG. 3 is a plan view showing a thrust foil bearing according to the first embodiment of the present disclosure.
Figure 4:
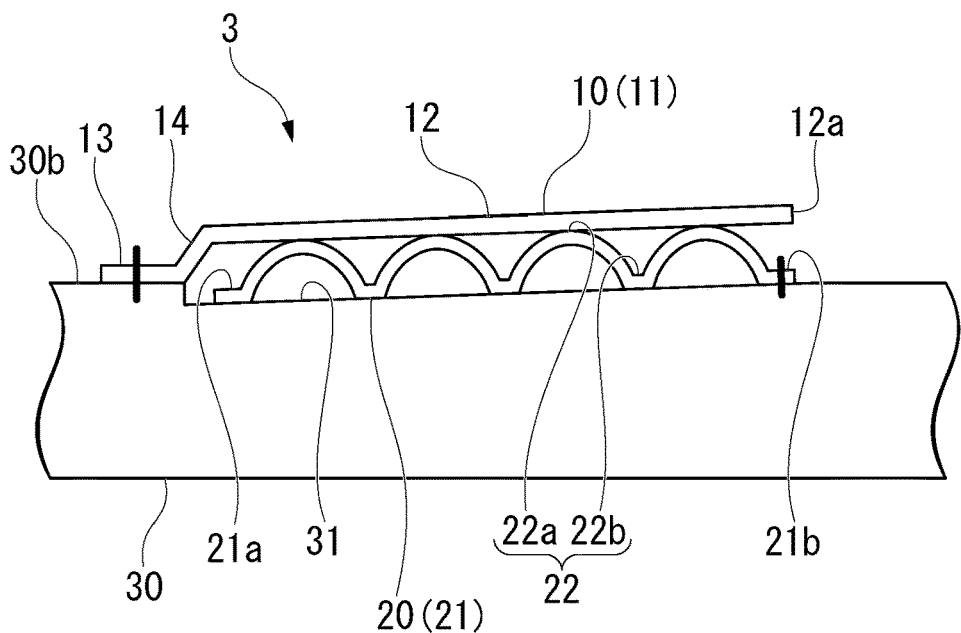
FIG. 4 is a view when seen from arrow A-A shown in FIG. 3.

FIG. 3 is a plan view showing the thrust foil bearing 3 according to the first embodiment of the present disclosure. FIG. 4 is a view when seen from arrow A-A shown in FIG. 3.

As shown in FIG. 3, the base plate 30 has an insertion hole 30a through which the rotating shaft 1 is inserted.

In the following description, a positional relationship of each of members may be described with reference to the insertion hole 30a. Specifically, the "axial direction" refers to a direction in which the insertion hole 30a extends (a direction in which the rotating shaft 1 is inserted). Further, a "radial direction" refers to a radial direction of the insertion hole 30a. A "circumferential direction" refers to a circumferential direction along an inner peripheral surface of the insertion hole 30a. Alternatively, it can be said that they are the "radial direction" and the "circumferential direction" when seen from an axis of the rotating shaft 1 inserted through the insertion hole 30a. Further, a "rotation direction" refers to a direction in which the rotating shaft 1 or the thrust collar 4 inserted through the insertion hole 30a rotates.

The base plate 30 constitutes an outermost portion (on the side opposite to the thrust collar 4) of the thrust foil bearing 3 in the axial direction. That is, the base plate 30 sandwiches the top foil 10 and the back foil 20 between the thrust collar 4 and the base plate 30 in the axial direction. The insertion hole 30a is formed in the base plate 30. That is, the base plate 30 of the present disclosure is a disk-shaped member in which the insertion hole 30a is formed. However, when the insertion hole 30a is provided, the base plate 30 may be a member other than a disk shape (for example, a rectangular plate shape). Further, the insertion hole 30a does not necessarily have to have a strict cylindrical shape.

The base plate 30 is formed of, for example, a metal plate having a thickness of about several mm. A foil (the top foil 10 and the back foil 20) is disposed around the insertion hole 30a (an opening) in a flat surface 30b of the base plate 30 which is disposed to face the thrust collar 4. Specifically, the top foil 10 is supported by the back foil 20, and the back foil 20 is supported by the base plate 30. That is, the top foil 10 is also supported by the base plate 30 via the back foil 20.

The top foil 10 is formed of a plurality of thin metal plates (top foil pieces 11) arranged around the insertion hole 30a. The top foil piece 11 includes an inclined portion 12 which is inclined upward (the front side of the drawing in FIG. 3, or a direction from the base plate 30 to the top foil piece 11 in the axial direction) from one side in the circumferential direction (the upstream side in the rotation direction of the rotating shaft 1) toward the other side in the circumferential direction (the downstream side in the rotation direction of the rotating shaft 1), and a mounting portion 13 which is connected to one side of the inclined portion 12 in the circumferential direction and is mounted on the base plate 30.

As shown in FIG. 3, the inclined portion 12 is formed in a substantially trapezoidal shape in which the apex side of a fan shape is cut out and the inner peripheral side and the outer peripheral side are formed to have an arc shape. That is, the inclined portion 12 includes two end edges which are separated in the circumferential direction and extend from the inner peripheral side to the outer peripheral side, an inner peripheral end edge which connects the two end edges on the inner peripheral side, and an outer peripheral end edge which connects the two end edges on the outer peripheral side. An end edge of the inclined portion 12 on the other side in the circumferential direction which extends from the inner peripheral side to the outer peripheral side (hereinafter, referred to as an end portion 12a on the other side in the circumferential direction) is a free end.

On the other hand, an end edge of the inclined portion 12 on one side in the circumferential direction which extends from the inner peripheral side to the outer peripheral side is connected to the mounting portion 13 via a bent portion 14. As shown in FIG. 4, the bent portion 14 is configured of a first bend and a second bend located on the other side of the first bend in the circumferential direction. The first bend is bent to a back surface side of a surface of the top foil piece 11 which faces the base plate 30. The second bending is bent to a surface side of the top foil piece 11 which faces the base plate 30. That is, the bent portion 14 has a stepped shape. Both the first bend and the second bend have obtuse angles.

The inclined portion 12 located on the other side in the circumferential direction from the bent portion 14 is supported by a support portion 22 of the back foil piece 21 which will be described later. The inclined portion 12 supported by the support portion 22 is disposed to be inclined at an initial inclination angle to gradually separate from the base plate 30 as it goes from one side in the circumferential direction to the other side in the circumferential direction. Here, the initial inclination angle means an inclination angle of the top foil piece 11 with respect to the base plate 30 when a load is zero. The base plate 30 of the present disclosure has a flat surface 30b which extends in a direction orthogonal to the axial direction, and the inclined portion 12 is inclined with respect to the flat surface 30b.

The mounting portion 13 is connected to one side (the first bend side) of the bent portion 14 in the circumferential direction. In the present disclosure, the mounting portion 13 is formed in a strip shape having the same length as that of the bent portion 14 in the radial direction and is spot welded (dot welded) to the base plate 30. That is, this welding position is a mounting position of the top foil piece 11 with respect to the base plate 30. The top foil piece 11 can be mounted on the base plate 30 by, for example, screwing or the like, in addition to spot welding. Further, the mounting portion 13 and the bent portion 14 do not necessarily have to have the same length in the radial direction.

On the other hand, the back foil 20 is formed by a plurality of thin metal plates (the back foil pieces 21) arranged around the insertion hole 30a. The back foil piece 21 has the support portion 22 which supports the inclined portion 12 of the top foil piece 11. As shown in FIG. 4, the support portion 22 is a corrugated foil (a bump foil) in which peak portions 22a and valley portions 22b are alternately formed. The support portion 22 elastically supports the inclined portion 12 of the top foil piece 11.

For example, a bump foil, a spring foil described in Japanese Unexamined Patent Application, First Publication No. 2006-57652 or Japanese Unexamined Patent Application, First Publication No. 2004-270904, a back foil described in Japanese Unexamined Patent Application, First Publication No. 2009-299748, and the like can be used as the support portion 22. The spring foil described in Japanese Unexamined Patent Application, First Publication No. 2006-57652 or Japanese Unexamined Patent Application, First Publication No. 2004-270904, and the back foil described in Japanese Unexamined Patent Application, First Publication No. 2009-299748 are foils used for radial bearings, but when each of the foils is developed in a plane and formed in an annular plate shape, a foil (the support portion 22) used for the thrust foil bearing 3 is obtained.

The support portion 22 of the present disclosure is formed of a bump foil. The support portion 22 is formed to be smaller than the inclined portion 12 of the top foil piece 11 in the plan view shown in FIG. 3. Therefore, the support portion 22 is covered with the inclined portion 12. Like the inclined portion 12, the support portion 22 is formed in a substantially trapezoidal shape in which the apex side of a fan shape is cut out and the inner peripheral side and the outer peripheral side are formed to have an arc shape. That is, the support portion 22 includes two end edges which are separated in the circumferential direction and extend from the inner peripheral side to the outer peripheral side, an inner peripheral end edge which connects the two end edges on the inner peripheral side, and an outer peripheral end edge which connects the two end edges on the outer peripheral side.

A parallel portion (hereinafter, referred to as a back foil end portion 21a) which extends parallel to an end edge (hereinafter, an end portion on the other side in the circumferential direction) of the support portion 22 on the other side in the circumferential direction extending from the inner peripheral side to the outer peripheral side is formed at an end edge (hereinafter, an end portion on one side in the circumferential direction) of the support portion 22 on one side in the circumferential direction which extends from the inner peripheral side to the outer peripheral side. The valley portions 22b and the peak portions 22a are alternately connected to the support portion 22 in a first direction from the back foil end portion 21a toward an end portion of the support portion 22 on the other side in the circumferential direction, that is, in a normal direction (also, referred to as a direction orthogonal to a ridgeline of the peak portion 22a) orthogonal to an end portion of the back foil end portion 21a or the support portion 22 on the other side in the circumferential direction.

As shown in FIG. 4, the valley portion 22b has a flat surface and faces the base plate 30. Further, the peak portion 22a is an arch-shaped portion which connects the adjacent valley portions 22b. The back foil piece 21 is supported by the base plate 30. Therefore, the valley portion 22b can come into contact with the base plate 30. Both end portions of the support portion 22, that is, the back foil end portion 21a and the end portion of the support portion 22 on the other side in the circumferential direction (hereinafter, the mounting portion 21b) are formed by the valley portions 22b, respectively.

In the present disclosure, the valley portions 22b and the peak portions 22a are formed at substantially a uniform pitch. Further, a height of the peak portion 22a is formed at a constant height (a difference in a height between the valley portion 22b and the peak portion 22a). That is, the back foil piece 21 is formed such that the difference in the height between adjacent valley portions 22b and peak portions 22a is constant. A support surface 31 which supports the support portion 22 is formed on the base plate 30. The support surface 31 is an inclined surface of which a height gradually increases toward the other side in the first direction (the right side of the drawing in FIG. 4). In the present disclosure, a direction to the other side in the first direction and a direction to the other side in the circumferential direction do not match, but an angle between them is a minor angle. The support surface 31 is inclined at a predetermined angle with respect to the flat surface 30b of the base plate 30. This angle corresponds to the initial inclination angle of the inclined portion 12 of the top foil piece 11. When the support surface 31 is not inclined, the height of the peak portion 22a may gradually increase toward the other side in the first direction.

The mounting portion 21b of the back foil piece 21 is spot welded (dot welded) to the base plate 30. That is, this welding position is a mounting position of the back foil piece 21 with respect to the base plate 30. That is, in the present disclosure, the mounting position of the back foil piece 21 is the valley portion 22b (the mounting portion 21b) located at an end on the other side in the first direction (the right side of the drawing in FIG. 4).

Further, the valley portion 22b (the back foil end portion 21a) located at an end of the back foil piece 21 on one side in the first direction (the left side of the drawing in FIG. 4) is a free end. That is, when a load acts on the back foil piece 21, the back foil end portion 21a can move toward one side in the first direction. The back foil piece 21 can be mounted on the base plate 30 by, for example, screwing, in addition to spot welding.

As shown in FIG. 3, the top foil pieces 11 and the back foil pieces 21 having the above-described configuration are disposed in an annular shape around the insertion hole 30a. The base plate 30 of the present disclosure supports six top foil pieces 11 and back foil pieces 21 in the circumferential direction. A circumferential gap S1 which extends in the radial direction is formed between the top foil pieces 11 (back foil pieces 21) adjacent to each other in the circumferential direction. The width of the circumferential gap S1 gradually increases in the circumferential direction from the inner side in the radial direction to the outer side in the radial direction.

Returning to FIG. 2, a cooling hole 50 is formed in the case 8 surrounding the thrust collar 4. The cooling hole 50 is connected to a cooling gas supply source 9 and introduces a cooling gas G into the case 8. The cooling gas G is also introduced into the case 8 from a position other than the cooling hole 50. Specifically, the cooling gas G is introduced into the case 8 through a gap between one insertion hole 30a in the pair of base plates 30 and the rotating shaft 1.

The cooling gas G collides with the thrust collar 4 in the axial direction, then flows outward in the radial direction through the back side of the top foil piece 11 and the back foil piece 21 or the circumferential gap S1 (refer to FIG. 3), then flows around the outside of the thrust collar 4, circulates inward in the radial direction through the back side of the top foil piece 11 and the back foil piece 21 or the circumferential gap S1, and is discharged to the outside of the case 8 through a gap between the insertion hole 30a of the other base plate 30 and the rotating shaft 1. The cooling gas supply source 9 may be a cooling gas supply source common to the cooling gas G discharged in the axial direction, or may be a separately prepared cooling gas supply source (a fan, a blower, a pump, and the like).

The cooling hole 50 of the present disclosure is formed to pass through the bearing spacer 40 in the radial direction. That is, the cooling hole 50 is formed on the outer peripheral side of the case 8. The cooling hole 50 communicates the inner and outer circumferences (an inner peripheral surface and an outer peripheral surface) of the bearing spacer 40 which faces the thrust collar 4 in the radial direction. A first cooling hole 51 located at an axial position of the thrust collar 4 and a second cooling hole 52 located at an axial position of the top foil piece 11 as the cooling holes 50 are formed in the bearing spacer 40. That is, the first cooling hole 51 is provided at the same position in the axial direction as the thrust collar 4, and the second cooling hole 52 is provided at the same position in the axial direction as the top foil piece 11. The second cooling holes 52 correspond to the top foil pieces 11 of the pair of thrust foil bearings 3 and are formed on both sides of the first cooling hole 51 in the axial direction sandwiching the first cooling hole 51 in the axial direction.

The first cooling hole 51 is formed at an intermediate position of the thrust collar 4 in the axial direction. That is, the first cooling hole 51 faces an outer peripheral surface of the thrust collar 4. The first cooling hole 51 has a larger diameter than the second cooling hole 52. Alternatively, it can be said that an area of a portion corresponding to a throat is large according to a shape of the first cooling hole 51. Further, as shown in FIG. 3, a circumferential position of the first cooling hole 51 coincides with that of the circumferential gap S1. That is, in the present disclosure, six first cooling holes 51 are formed for the six circumferential gaps S1. Since a temperature distribution of the thrust collar 4 is substantially uniform in the circumferential direction, the circumferential position of the first cooling hole 51 does not necessarily have to coincide with that of the circumferential gap S1.

As shown in FIG. 2, the second cooling hole 52 is formed at an axial position of the end portion 12a of the top foil piece 11 on the other side in the inclined circumferential direction. That is, the axial position of the second cooling hole 52 may be about the same as a height (an axial position) of the ridgeline of the peak portion 22a of the back foil piece 21 which supports the top foil piece 11 at an end on the other side in the circumferential direction (an end on the right side of the drawing). Alternatively, it can be said that there is an opening at an axial position of the inner peripheral surface of the bearing spacer 40 which faces an axial position of a space between the thrust collar 4 and the base plate 30. As shown in FIG. 3, a plurality of second cooling holes 52 are formed with respect to one top foil piece 11 at intervals in the circumferential direction. A circumferential position of each of the second cooling holes 52 may be near the end portion 12a of the top foil piece 11 on the other side in the circumferential direction. Specifically, the circumferential positions of the second cooling holes 52 may be within a range of a circumferential width of the peak portion 22a located at the end on the other side in the circumferential direction and the peak portion 22a adjacent to the peak portion 22a (within the circumferential width of the two peak portions 22a).

Next, an operation of the thrust foil bearing 3 having such a configuration will be described.

As shown in FIG. 2, the thrust foil bearings 3 are provided on both sides of the thrust collar 4 in the axial direction sandwiching the thrust collar 4 in the axial direction. Therefore, movement of the rotating shaft 1 to both sides in a thrust direction (the axial direction) can be curbed.

When the rotating shaft 1 rotates in such a state and the thrust collar 4 starts rotating, while the thrust collar 4 and the top foil piece 11 rub against each other, a surrounding fluid is pushed into a wedge-shaped space formed therebetween. Then, when the thrust collar 4 reaches a predetermined rotation speed, a fluid lubricating film is formed therebetween. The top foil piece 11 is pressed to the back foil piece 21 by a pressure of the fluid lubricating film, and the thrust collar 4 is released from a contact state with the top foil piece 11 and rotates in a non-contact manner.

Figure 5:
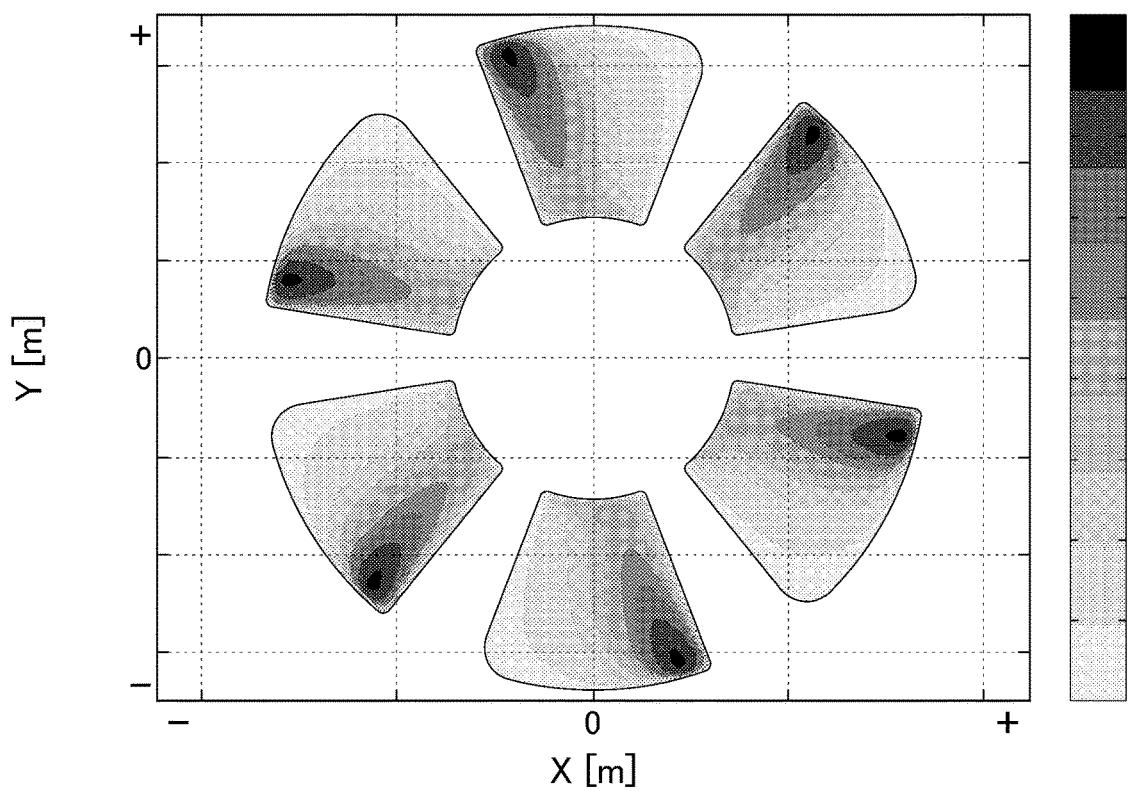
FIG. 5 is an analysis diagram showing a pressure distribution of a fluid lubricating film which acts on a top foil piece.

FIG. 5 is an analysis diagram showing the pressure distribution of the fluid lubricating film which acts on the top foil piece. In FIG. 5, high pressure is shown by deep dot and low pressure is shown by faint dot.

Since the downstream end side of the top foil piece (the downstream side in the rotation direction of the rotating shaft (the other side in the circumferential direction)) is a narrowest portion of the wedge-shaped space, as shown in FIG. 5, a high pressure due to the fluid lubricating film acts thereon. The high pressure due to the fluid lubricating film acts on the outer peripheral side of the top foil piece in FIG. 5, but a position thereof may change in the radial direction according to a support rigidity of the bump foil piece. However, since a peripheral speed of the thrust collar is faster on the outer peripheral side of the top foil piece than on the inner peripheral side thereof, a high pressure due to the fluid lubricating film tends to act on the outer peripheral side of the top foil piece.

That is, the outer peripheral side of the top foil piece 11 and the outer peripheral side of the thrust collar 4 which faces the outer peripheral side of the top foil piece 11 tend to generate heat due to a shearing force caused by a fluid viscosity of the fluid lubricating film. Here, in the present disclosure, as shown in FIG. 2, the cooling gas G is introduced from the gap between the insertion hole 30a of the base plate 30 and the rotating shaft 1. According to this cooling gas G, the thrust foil bearing 3 can be uniformly cooled. However, as described above, since the temperature distribution of the top foil piece 11 and the thrust collar 4 is not uniform, and the temperature is highest at a thin portion of the fluid lubricating film (near the end portion 12a of the top foil piece 11 on the other side in the circumferential direction), efficient cooling may not be possible only with the cooling gas G introduced from the gap between the insertion hole 30a of the base plate 30 and the rotating shaft 1.

Thus, in the present disclosure, as shown in FIG. 2, the cooling hole 50 is formed in the annular bearing spacer 40 mounted on the outer peripheral side of the case 8, specifically, the outer peripheral side of the base plate 30. In this way, the cooling gas G can be sprayed on the outer peripheral side of the thrust collar 4 and the outer peripheral side of the top foil piece 11 by forming the cooling hole 50 for discharging the cooling gas G in an inner peripheral surface of the annular component (the bearing spacer 40) installed to include the outer peripheral surface of the thrust collar 4. That is, since the cooling gas G can be directly sprayed to a heat generating source of the thrust foil bearing 3, the thrust foil bearing 3 can be efficiently cooled. Thus, it is possible to curb distortion of the surface of the top foil piece 11 or the thrust collar 4 due to heat and to curb a decrease in a load capacity of the thrust foil bearing 3.

Further, the first cooling hole 51 located at the axial position of the thrust collar 4 and the second cooling hole 52 located at the axial position of the top foil piece 11 are formed as cooling holes 50 in the bearing spacer 40. Since the cooling gas G can be directly sprayed on the outer peripheral surface of the thrust collar 4 by forming the first cooling hole 51, the outer peripheral side of the thrust collar 4 can be efficiently cooled. Furthermore, as shown in FIG. 3, since the cooling gas G can be directly sprayed to the end portion 12a of the top foil piece 11 on the other side in the circumferential direction, in which the fluid lubricating film becomes thin, by forming the second cooling hole 52, the outer peripheral side of the top foil piece 11 can be efficiently cooled.

Therefore, according to the above-described first embodiment, it is possible to curb a decrease in the load capacity of the thrust foil bearing 3 due to heat generation of the fluid lubricating film by adopting a configuration in which the foil which faces the thrust collar 4 mounted on the rotating shaft 1 in the axial direction, and the case 8 which supports the foil and surrounds the thrust collar 4 are included and the cooling hole 50 is formed in the case 8.

Second Embodiment

Next, a second embodiment of the present disclosure will be described. In the following description, the same or equivalent configurations as those in the above-described embodiment are designated by the same reference numerals, and the description thereof will be simplified or omitted.

Figure 6:
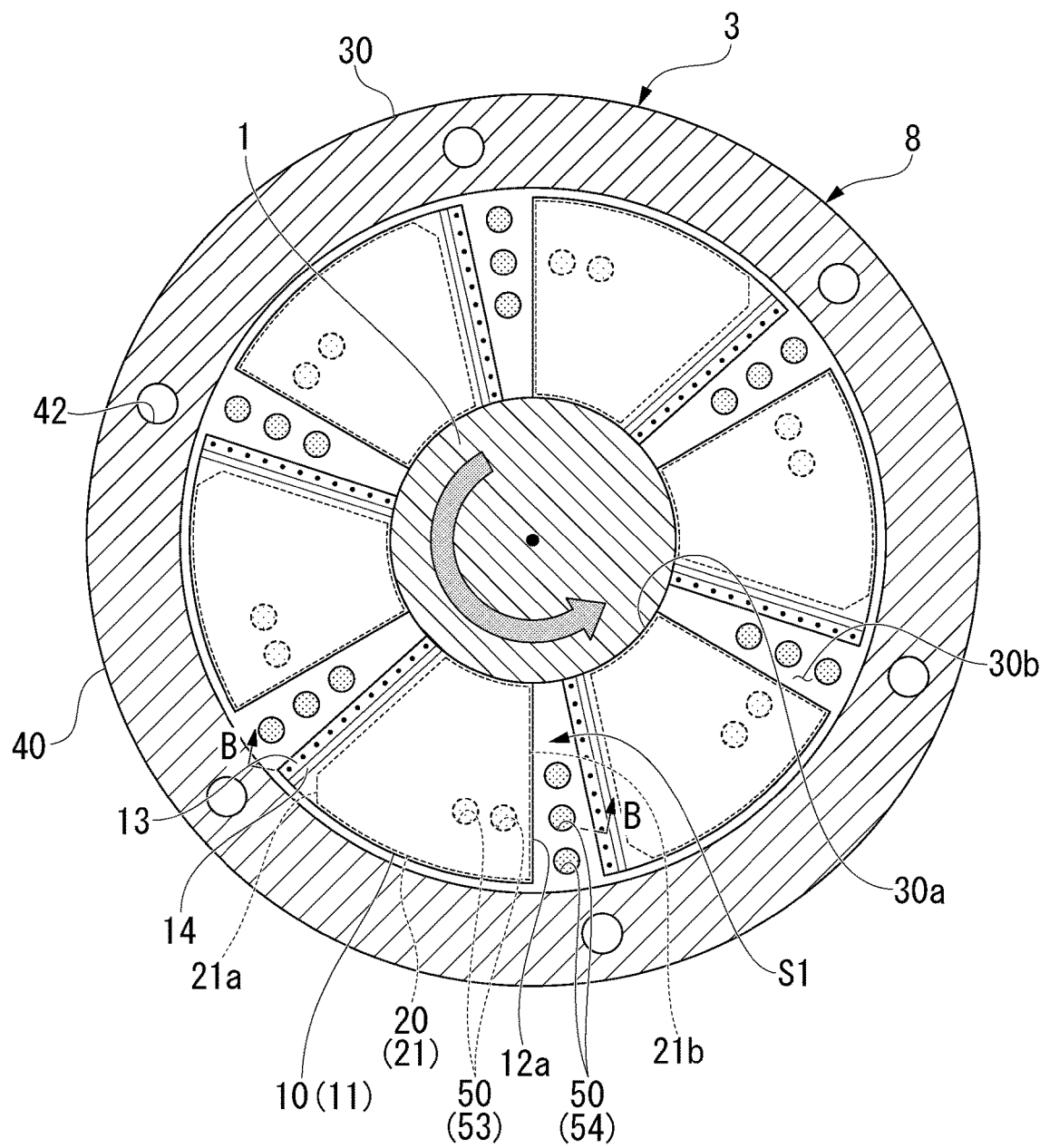
FIG. 6 is a plan view showing a thrust foil bearing according to a second embodiment of the present disclosure.
Figure 7:
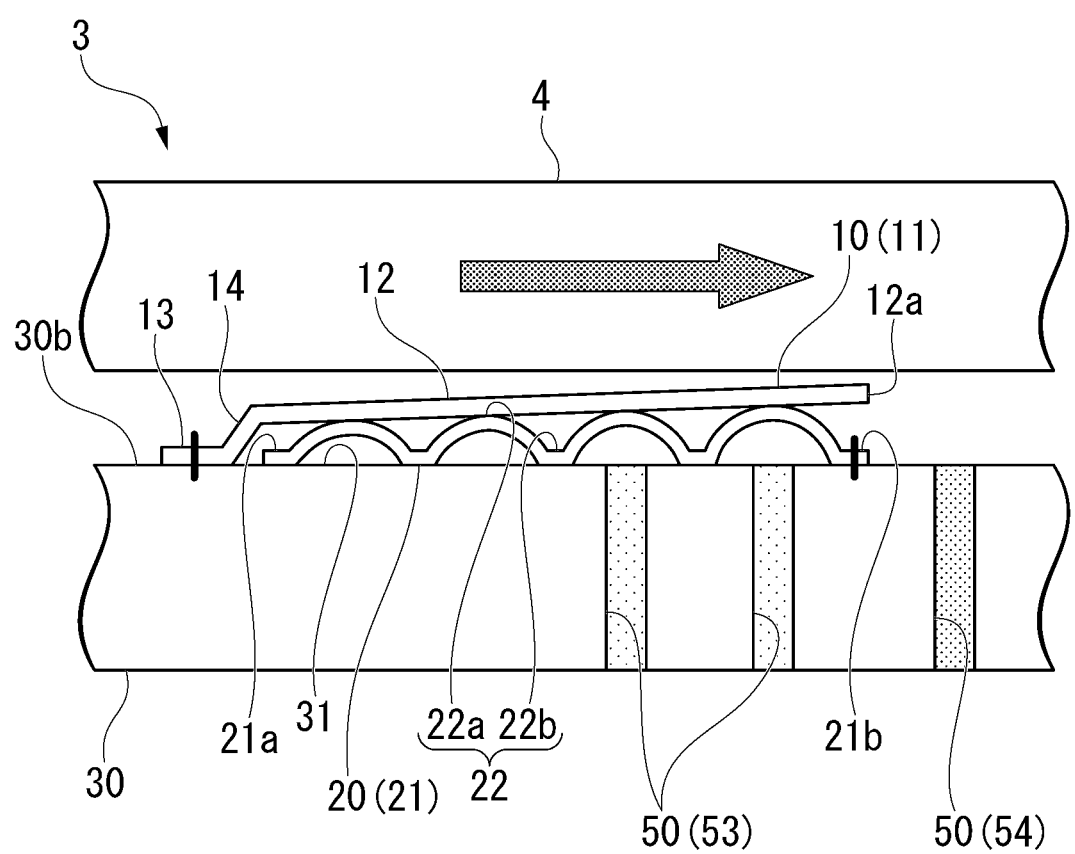
FIG. 7 is a view when seen from arrow B-B shown in FIG. 6.

FIG. 6 is a plan view showing the thrust foil bearing 3 according to the second embodiment of the present disclosure. FIG. 7 is a view when seen from arrow B-B shown in FIG. 6.

As shown in the drawings, the second embodiment is different from the above-described embodiment in that the cooling holes 50 are formed in the outer peripheral side of the base plate 30 instead of the bearing spacer 40. The outer peripheral side of the base plate 30 refers to an annular region which extends from an intermediate position of a radial distance from the insertion hole 30a to the inner peripheral surface of the bearing spacer 40 to a radial position of the inner peripheral surface of the bearing spacer 40.

A third cooling hole 53 which overlaps the top foil piece 11 (or the back foil piece 21) in the axial direction and a fourth cooling hole 54 which does not overlap the top foil piece 11 in the axial direction are formed as cooling holes 50 in the base plate 30. That is, when seen in the axial direction from the outside of the case 8, the back foil piece 21 is visible through the third cooling hole 53, and the thrust collar 4 is visible through the fourth cooling hole 54. As shown in FIG. 7, the third cooling hole 53 is formed on the support surface 31 on which the top foil piece 11 and the back foil piece 21 are disposed. The third cooling hole 53 faces a back surface (a non-grounded region, a region which is not in contact with the support surface 31) of the peak portion 22a of the back foil piece 21. A plurality of third cooling holes 53 are formed at intervals in the first direction to face the back surfaces of the peak portion 22a located at the end on the other side in the first direction (on the right side of the drawing in FIG. 7) and the peak portion 22a adjacent to the peak portions 22a.

As shown in FIG. 6, a plurality of fourth cooling holes 54 are formed in the circumferential gap S1 of the top foil piece 11 and the back foil piece 21 at intervals in the radial direction. The fourth cooling hole 54 is formed on the outer peripheral side of the circumferential gap S1. Specifically, the fourth cooling holes 54 are formed at a total of three locations including an intermediate position (referred to as a first position) of a radial distance between the inner peripheral surface of the insertion hole 30a (the inner end of the base plate 30 in the radial direction) and the inner peripheral surface of the bearing spacer 40, a radial position (referred to as a second position) near the outer peripheral end edge of the top foil piece 11, and a radial intermediate position (referred to as a third position) between the first position and the second position.

According to the second embodiment of the above-described configuration, the cooling gas G can be directly sprayed to the back surface of the back foil piece 21 which supports the top foil piece 11 by the third cooling hole 53 formed at a position at which it overlaps the top foil piece 11 in the axial direction. Therefore, the outer peripheral side of the top foil piece 11 can be efficiently cooled via the back foil piece 21. Further, the cooling gas G can be directly sprayed to the thrust collar 4 without being blocked by the top foil piece 11 by the fourth cooling hole 54 formed at a position at which it does not overlap the top foil piece 11 in the axial direction. Therefore, the outer peripheral side of the thrust collar 4 can be efficiently cooled.

Third Embodiment

Next, a third embodiment of the present disclosure will be described. In the following description, the same or equivalent configurations as those in the above-described embodiment are designated by the same reference numerals, and the description thereof will be simplified or omitted.

Figure 8:
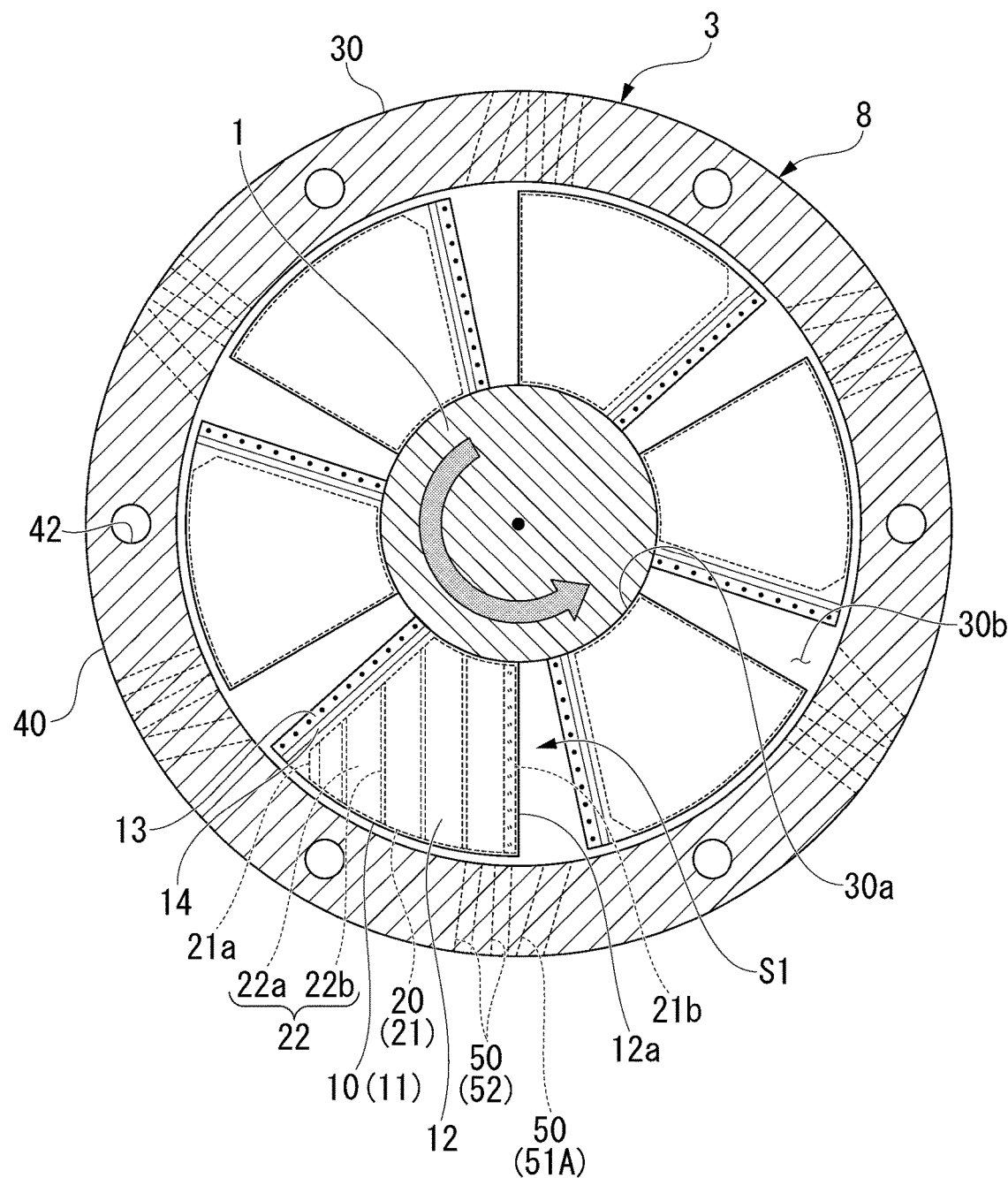
FIG. 8 is a plan view showing a thrust foil bearing according to a third embodiment of the present disclosure.

FIG. 8 is a plan view showing the thrust foil bearing 3 according to the third embodiment of the present disclosure.

As shown in FIG. 8, in the third embodiment, part of the cooling hole 50 is inclined in a rotation direction of the thrust collar 4 as it goes from the outer side in the radial direction to the inner side in the radial direction. In FIG. 8, a first cooling hole 51A formed in the bearing spacer 40 is inclined in the rotation direction of the thrust collar 4 as it goes from the outer side in the radial direction to the inner side in the radial direction.

An opening position of the first cooling hole 51A on the inner peripheral surface of the bearing spacer 40 is located on the other side in the circumferential direction (the downstream side in the rotation direction) with respect to an opening position on the outer peripheral surface of the bearing spacer 40. As described above, the first cooling hole 51A is formed at the axial position of the thrust collar 4, and the cooling gas G can be sprayed on the outer peripheral surface of the thrust collar 4.

In this way, when the first cooling hole 51A is inclined in the rotation direction of the thrust collar 4, a relative speed of the cooling gas G to be sprayed with respect to the rotating thrust collar 4 becomes small, and bearing loss is reduced. Further, since the cooling gas G sprayed from the first cooling hole 51A is supplied to the top foil piece 11 on the downstream side in the rotation direction of the thrust collar 4, the cooling effect of the top foil piece 11 disposed on the downstream side in the rotation direction can be improved.

Figure 9:
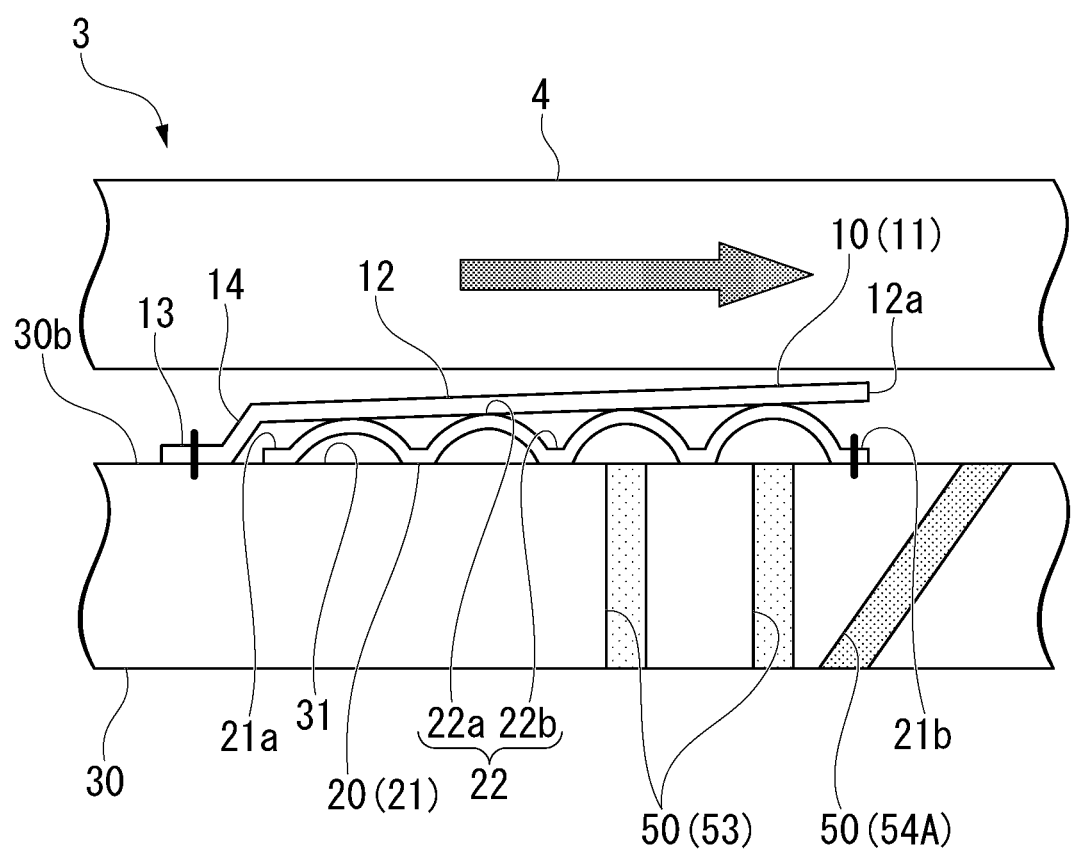
FIG. 9 is a cross-sectional view showing a thrust foil bearing according to fourth embodiment of the present disclosure.

Further, a fourth embodiment as shown in FIG. 9 can be adopted.

FIG. 9 is a cross-sectional view showing a thrust foil bearing 3 according to the fourth embodiment of the present disclosure. FIG. 9 corresponds to the B-B cross section of FIG. 6 described above.

As shown in FIG. 9, a fourth cooling hole 54A formed in the base plate 30 may be inclined in the rotation direction of the thrust collar 4 as it goes from the base plate 30 toward the thrust collar 4 in the axial direction. That is, in the fourth cooling hole 54A, the opening position of the base plate 30 on the flat surface 30b on the thrust collar 4 side may be located on the other side in the circumferential direction (the downstream side in the rotation direction) with respect to the opening position of the base plate 30 on the surface opposite to the thrust collar 4.

In this way, when the fourth cooling hole MA is inclined in the rotation direction of the thrust collar 4, similar to the first cooling hole 51A described above, the relative speed of the cooling gas G to be sprayed to the rotating thrust collar 4 becomes small, and the bearing loss is reduced. Further, since the cooling gas G sprayed from the fourth cooling hole MA is supplied to the top foil piece 11 on the downstream side of the thrust collar 4 in the rotation direction, the cooling effect of the top foil piece 11 disposed on the downstream side in the rotation direction can be improved.

Fifth Embodiment

Next, a fifth embodiment of the present disclosure will be described. In the following description, the same or equivalent configurations as those in the above-described embodiment are designated by the same reference numerals, and the description thereof will be simplified or omitted.

Figure 10:
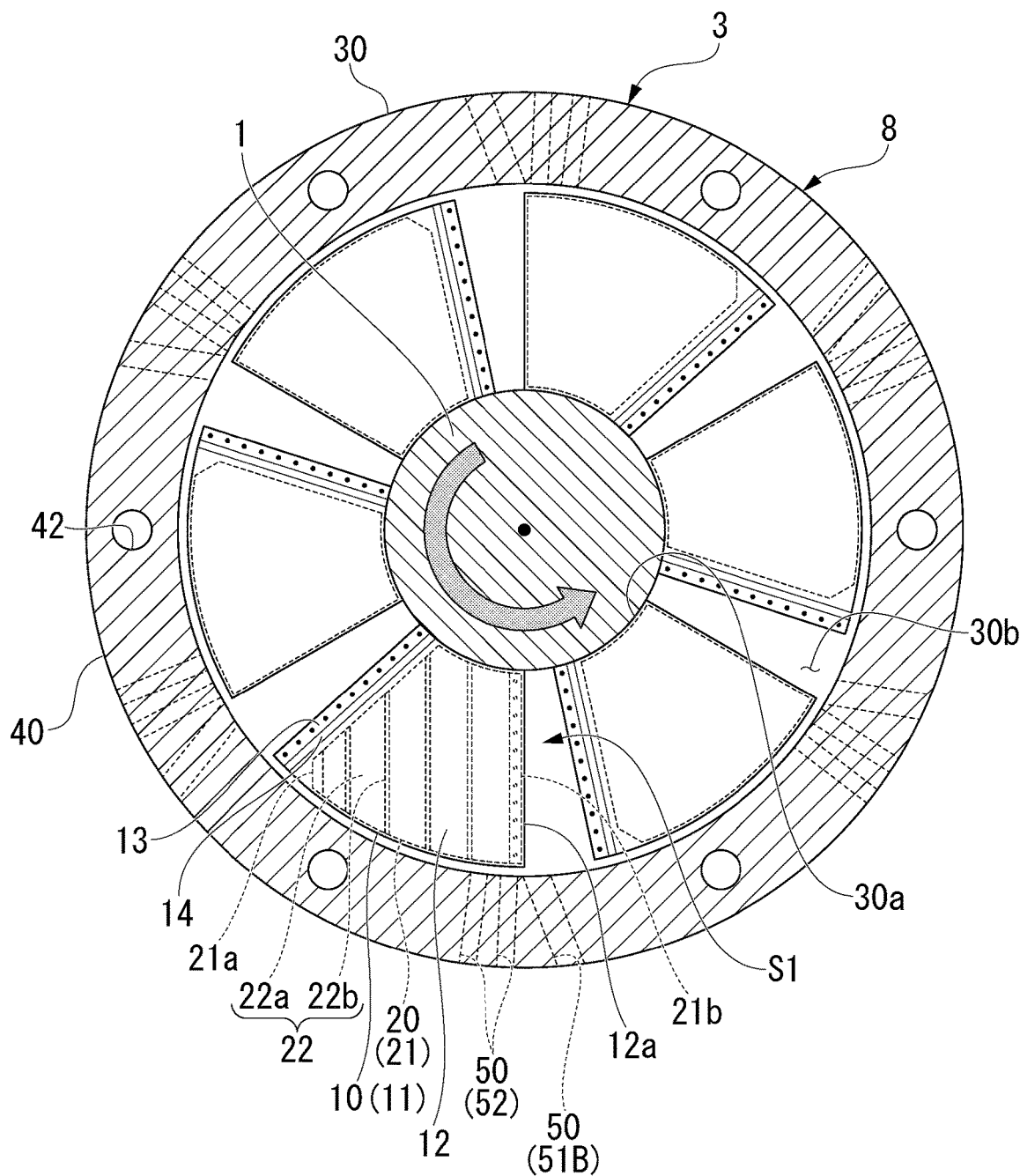
FIG. 10 is a plan view showing a thrust foil bearing according to a fifth embodiment of the present disclosure.

FIG. 10 is a plan view showing a thrust foil bearing 3 according to the fifth embodiment of the present disclosure.

As shown in FIG. 10, in the fifth embodiment, part of the cooling hole 50 is inclined in a rotation direction opposite to the rotation direction of the thrust collar 4 as it goes from the outer side in the radial direction to the inner side in the radial direction. In FIG. 10, a first cooling hole 51B formed in the bearing spacer 40 is inclined in the direction opposite to the rotation direction of the thrust collar 4 as it goes from the outer side in the radial direction to the inner side in the radial direction.

The opening position of the first cooling hole 51B on the inner peripheral surface of the bearing spacer 40 is located on one side in the circumferential direction (the upstream side in the rotation direction) with respect to the opening position on the outer peripheral surface of the bearing spacer 40. As described above, the first cooling hole 51B is formed at the axial position of the thrust collar 4, and the cooling gas G can be sprayed on the outer peripheral surface of the thrust collar 4.

In this way, when the first cooling hole 51B is inclined in the direction opposite to the rotation direction of the thrust collar 4, the relative speed of the cooling gas G to be sprayed to the rotating thrust collar 4 increases. That is, when seen from the thrust collar 4 side, the cooling gas G is sprayed at a high speed, and thus the cooling efficiency of the thrust collar 4 can be improved.

Figure 11:
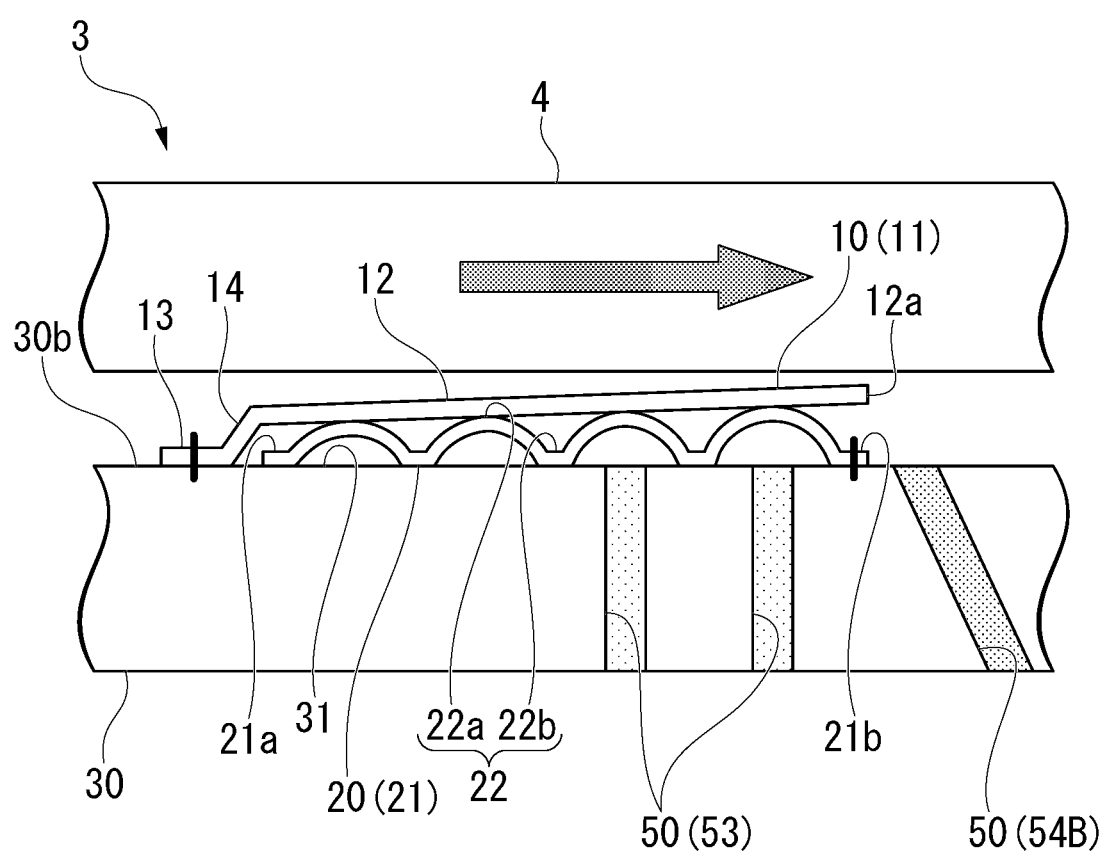
FIG. 11 is a cross-sectional view showing a thrust foil bearing according to a sixth embodiment of the present disclosure.

Further, a sixth embodiment as shown in FIG. 11 can be adopted.

FIG. 11 is a cross-sectional view showing a thrust foil bearing 3 according to the sixth embodiment of the present disclosure. FIG. 11 corresponds to the B-B cross section of FIG. 6 described above.

As shown in FIG. 11, the fourth cooling hole 54B formed in the base plate 30 may be inclined in the direction opposite to the rotation direction of the thrust collar 4 as it goes from the base plate 30 toward the thrust collar 4 in the axial direction. That is, in the fourth cooling hole 54B, the opening position of the base plate 30 on the flat surface 30b on the thrust collar 4 side may be located on one side in the circumferential direction (the upstream side in the rotation direction) with respect to the opening position of the base plate 30 on the surface opposite to the thrust collar 4.

In this way, when the fourth cooling hole 54B is inclined in the direction opposite to the rotation direction of the thrust collar 4, similar to the first cooling hole 51B described above, the relative speed of the cooling gas G to be sprayed to the rotating thrust collar 4 increases. That is, when seen from the thrust collar 4 side, the cooling gas G is sprayed at a high speed, and thus the cooling efficiency of the thrust collar 4 can be improved.

Seventh Embodiment

Next, a seventh embodiment of the present disclosure will be described. In the following description, the same or equivalent configurations as those in the above-described embodiment are designated by the same reference numerals, and the description thereof will be simplified or omitted.

Figure 12:
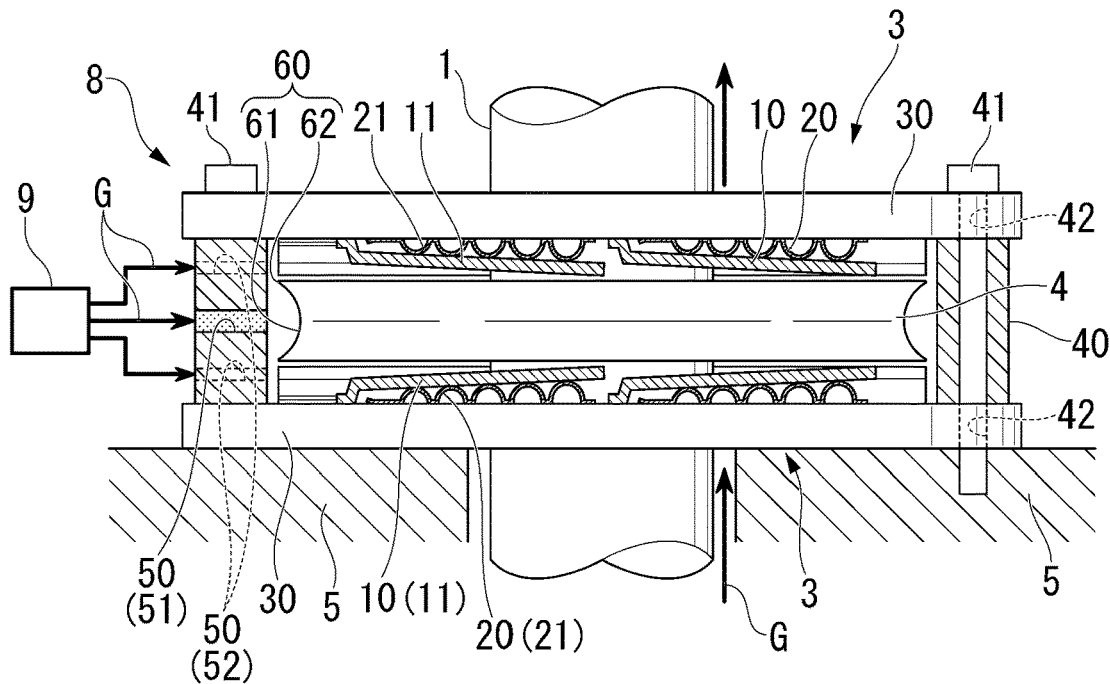
FIG. 12 is a side view showing a thrust foil bearing according to a seventh embodiment of the present disclosure.

FIG. 12 is a side view showing a thrust foil bearing 3 according to the seventh embodiment of the present disclosure.

As shown in FIG. 12, in the seventh embodiment, an unevenness 60 is formed on the outer peripheral surface of the thrust collar 4.

The unevenness 60 shown in FIG. 12 includes an annular concave portion 61 having an intermediate position of the thrust collar 4 in the axial direction as a groove bottom in the radial direction, and an annular convex portion 62 which protrudes outward in the radial direction relative to the groove bottom of the concave portion 61. The concave portion 61 is formed in a semicircular shape from one end portion to the other end portion in the axial direction on the outer peripheral surface of the thrust collar 4. The convex portion 62 extends to a radial position (an outer end portion in the radial direction) of the outer peripheral surface of the thrust collar 4 on both sides of the concave portion 61 in the axial direction.

According to the seventh embodiment of the above-described configuration, since a contact area with the cooling gas G sprayed from the cooling hole 50 (the first cooling hole 51) is increased by forming the unevenness 60 on the outer peripheral surface of the thrust collar 4, the cooling efficiency on the outer peripheral side of the thrust collar 4 can be increased.

Figure 13:
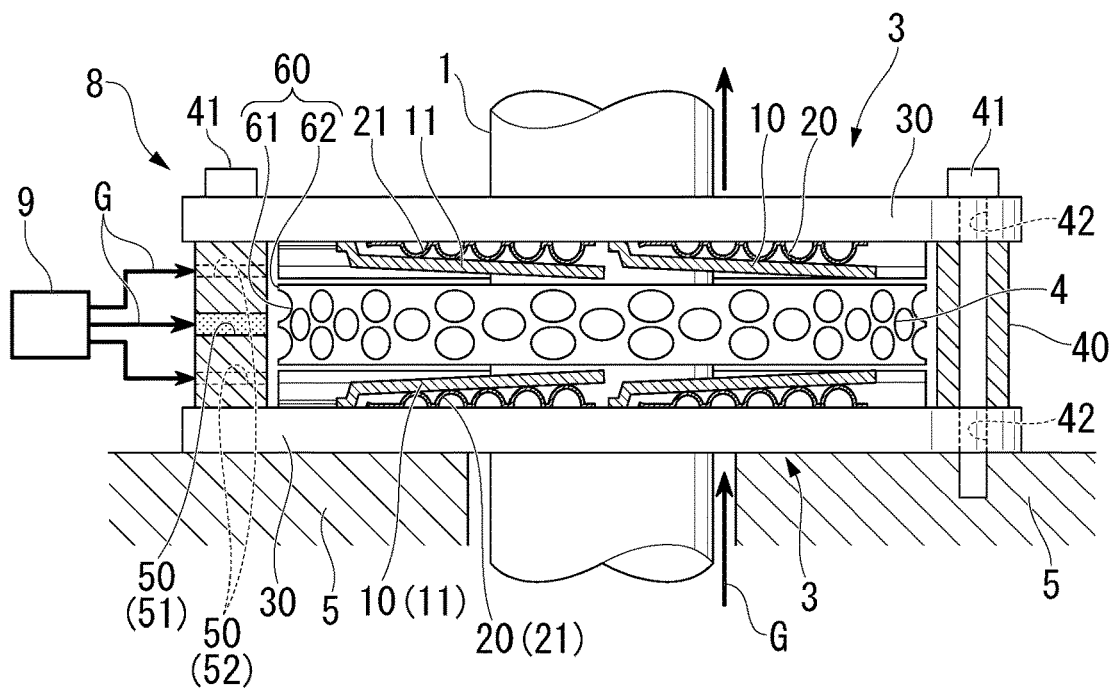
FIG. 13 is a side view showing a thrust foil bearing according to a modified example of the seventh embodiment of the present disclosure.

Further, in the seventh embodiment, a modified example as shown in FIG. 13 can be adopted.

FIG. 13 is a side view showing a thrust foil bearing 3 according to a modified example of the seventh embodiment of the present disclosure.

As shown in FIG. 13, a plurality of concave portions 61 may be formed on the outer peripheral surface of the thrust collar 4. The concave portion 61 shown in FIG. 13 is formed in a hemispherical shape on the outer peripheral surface of the thrust collar 4. The outer peripheral surface of the thrust collar 4 is formed in a dimple shape by the plurality of concave portions 61. The convex portion 62 is an outer peripheral surface of the thrust collar 4 in which the concave portion 61 is not formed.

Since the contact area with the cooling gas G sprayed from the cooling hole 50 (the first cooling hole 51) is increased by forming the unevenness 60 on the outer peripheral surface of the thrust collar 4 in this way, the cooling efficiency on the outer peripheral side of the thrust collar 4 can be increased.

Although embodiments of the present disclosure has been described above with reference to the drawings, the present disclosure is not limited to the above-described embodiments. The various shapes and combinations of the constituent members shown in the above-described embodiments are examples and can be variously changed based on design requirements and the like without departing from the scope of the present disclosure as claimed.

For example, in the above-described embodiment, although the case 8 in which the first cooling hole 51 and the second cooling hole 52 are formed has been described, the case 8 may be a case in which one of the first cooling hole 51 and the second cooling hole 52 is formed.

Further, in the above-described embodiment, although the case 8 in which the third cooling hole 53 and the fourth cooling hole 54 are formed has been described, the case 8 may be a case in which one of the third cooling hole 53 and the fourth cooling hole 54 is formed.

Further, the case 8 may be formed by combining the first cooling hole 51, the third cooling hole 53, and the fourth cooling hole 54.

Further, the case 8 may be formed by combining the second cooling hole 52, the third cooling hole 53, and the fourth cooling hole 54.

Figure 14:
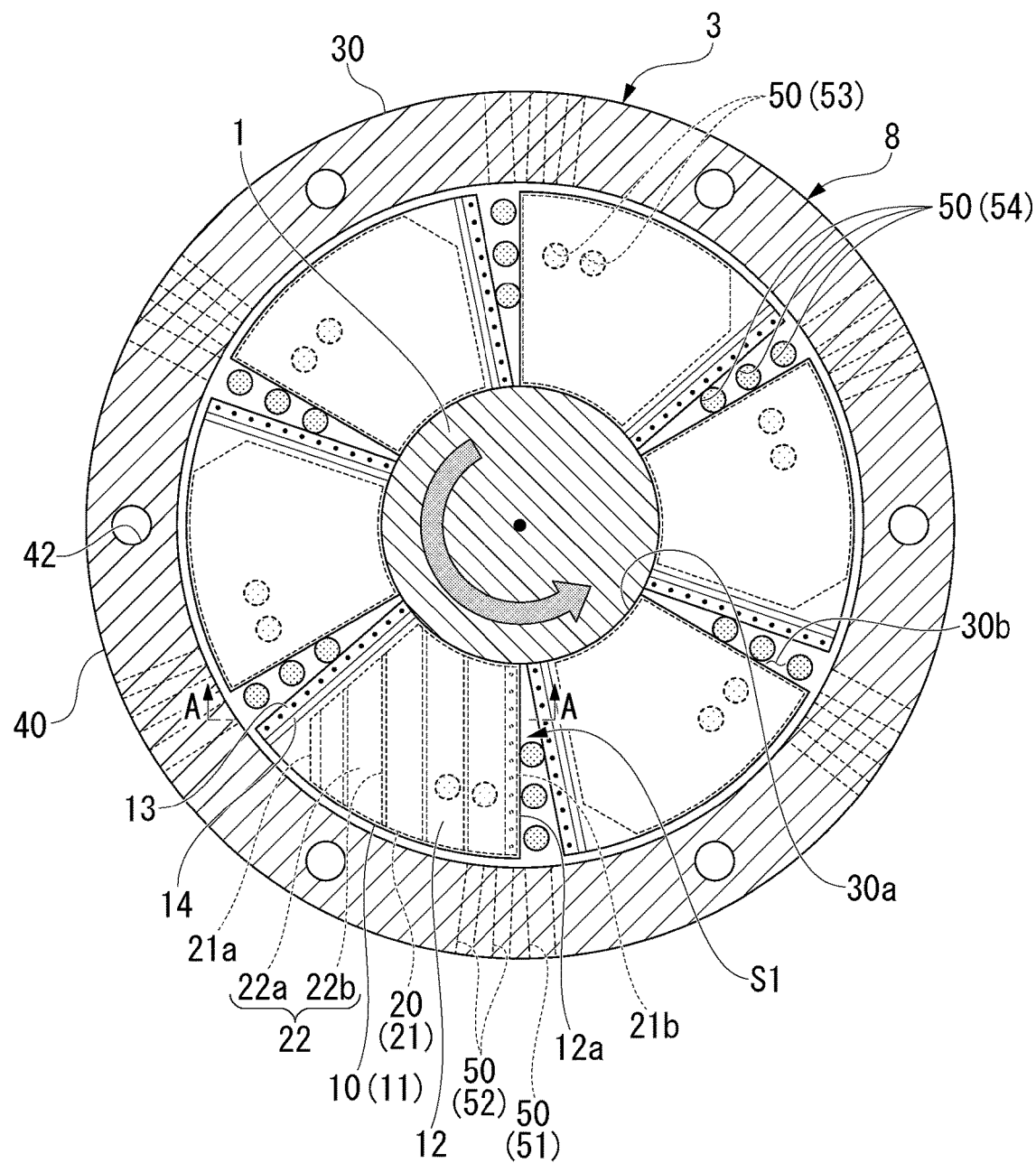
FIG. 14 is another example of the thrust foil bearing.

That is, the case 8 may be in a form in which at least one of the first cooling hole 51, the second cooling hole 52, the third cooling hole 53, and the fourth cooling hole 54 is formed. FIG. 14 shows an example where the first cooling hole 51, the second cooling hole 52, the third cooling hole 53, and the fourth cooling hole 52 are formed in the case 8. Similar to FIG. 3, FIG. 14 shows a sectional views of the cooling holes 50, 52 in the plain view such that positional relationships in the circumferential direction of the cooling holes 50, 52 are easier to understand.

INDUSTRIAL APPLICABILITY

The present disclosure can be applied to a thrust foil bearing that can suppress a decrease in the load capacity of the thrust foil bearing due to heat generation of the fluid lubricating film.

What is claimed is:
1. A thrust foil bearing comprising:
a foil which faces a thrust collar mounted on a shaft in an axial direction; and
a case which supports the foil and surrounds the thrust collar,
wherein the case includes a base plate which supports the foil and has an insertion hole formed therein through which the shaft is inserted, and an annular bearing spacer which is mounted on an outer peripheral side of the base plate, and
wherein the bearing spacer includes a first cooling hole located at an axial position of the thrust collar and a second cooling hole located at an axial position of the foil.
2. The thrust foil bearing according to claim 1,
wherein the first cooling hole is inclined in a rotation direction of the thrust collar as it goes from an outer side in a radial direction to an inner side in the radial direction.
3. The thrust foil bearing according to claim 1,
wherein the first cooling hole is inclined in a direction opposite to a rotation direction of the thrust collar as it goes from an outer side in a radial direction to an inner side in the radial direction.
4. The thrust foil bearing according to claim 1,
wherein unevenness is formed on an outer peripheral surface of the thrust collar.
5. The thrust foil bearing according to claim 1,
wherein a third cooling hole which overlaps the foil in the axial direction and a fourth cooling hole which does not overlap the foil in the axial direction are formed in the base plate.
6. A thrust foil bearing comprising:
a foil which faces a thrust collar mounted on a shaft in an axial direction; and
a case which supports the foil and surrounds the thrust collar,
wherein the case includes a base plate which supports the foil and has an insertion hole formed therein through which the shaft is inserted, and an annular bearing spacer which is mounted on an outer peripheral side of the base plate, and
wherein the base plate includes a third cooling hole which overlaps the foil in the axial direction and a fourth cooling hole which does not overlap the foil in the axial direction.
7. The thrust foil bearing according to claim 6,
wherein the fourth cooling hole is inclined in a rotation direction of the thrust collar as it goes through the base plate of the case toward the thrust collar in the axial direction.
8. The thrust foil bearing according to claim 6,
wherein the fourth cooling hole is inclined in a direction opposite to a rotation direction of the thrust collar as it goes through the base plate of the case toward the thrust collar in the axial direction.

* * * * *